April 4, 1961 D. H. SHEPARD 2,978,590

SCANNING APPARATUS

Original Filed April 20, 1956

INVENTOR

David H. Shepard

BY Mason, Fenwick & Lawrence

ATTORNEYS

United States Patent Office 2,978,590

Patented Apr. 4, 1961

2,978,590

SCANNING APPARATUS

David H. Shepard, Falls Church, Va., assignor to Intelligent Machines Research Corporation, Arlington, Va., a corporation of Maryland Original application Apr. 20, 1956, Ser. No. 579,594, now Patent No. 2,943,208, dated June 28, 1960. Divided and this application July 29, 1957, Ser. No. 674,937

5 Claims. (Cl. 250—233)

Figures 1, 2:
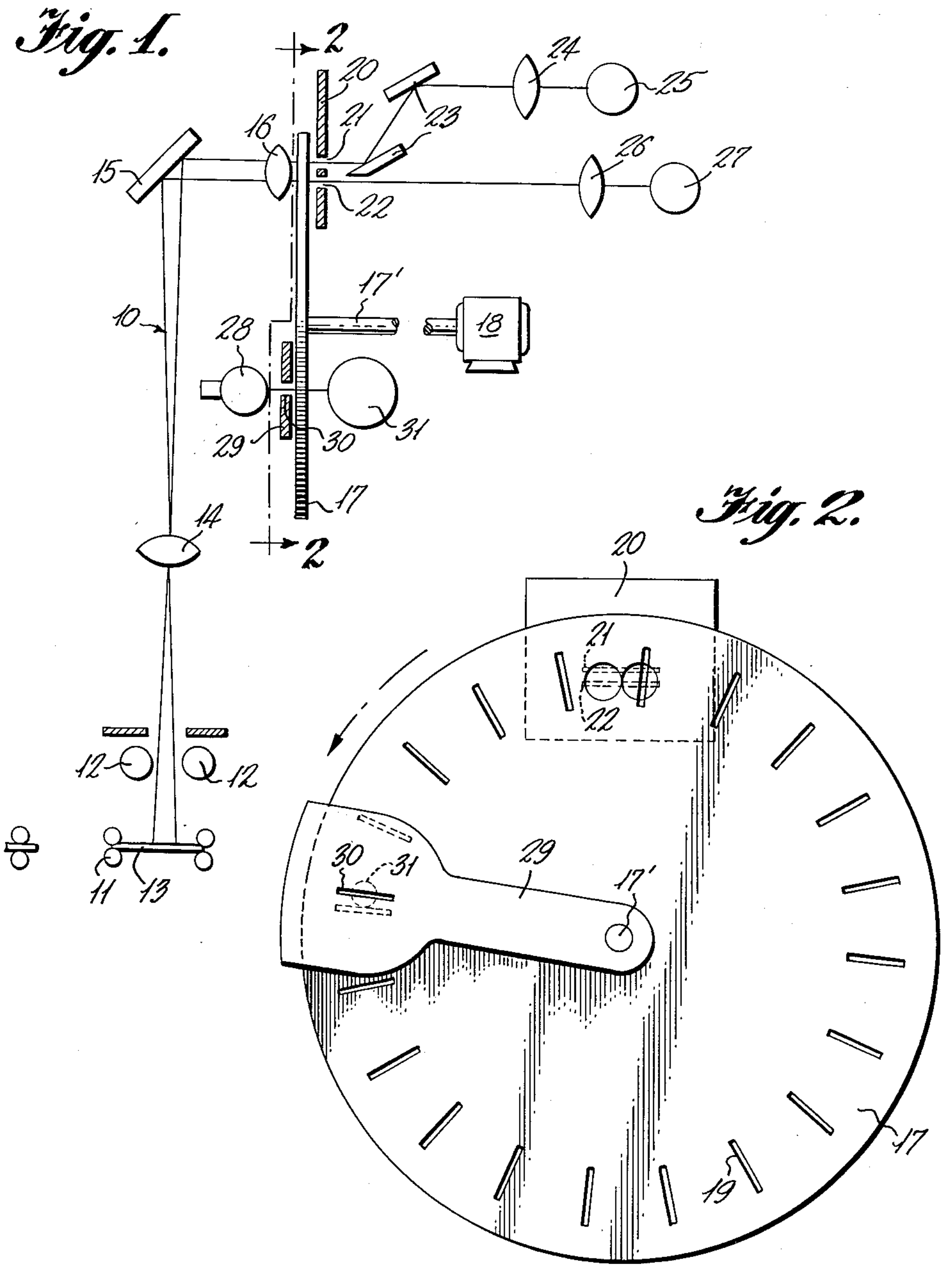

The present invention relates in general to high speed scanning devices for scanning a field such as a character-bearing document or the like in progressive lines of scan, and more particularly to rotary disk scanning units for use with high speed automatic character sensing equipment.

This application is a voluntary division of the copending application of David H. Shepard and Howard W. Silsby III, filed April 20, 1956, and bearing Serial No. 579,594, now U.S. Patent No. 2,943,208, issued June 28, 1960.

The present invention is particularly applicable to the field of automatic character sensing, and the ensuing description will be particularly applied to that field. Automatic character sensing equipment as employed in this field may briefly be described as apparatus which scan intelligence-bearing documents or the like containing items of information such as printed characters, sense the presence and/or absence of bits of each character thereon in reference to a time and/or positional base and relation and produce signals indicative of the presence and absence of such bits of characters within the scanning field, interpret the signals thus produced to identify the character sensed, and produce an output at some desired time indicative of the character read. Examples of such apparatus are disclosed in U.S. Patent No. 2,663,758, granted December 22, 1953, to David H. Shepard and the copending patent application of David H. Shepard, Serial No. 399,227, filed December 17, 1953, entitled Apparatus for Reading, now U.S. Patent 2,897,481, issued July 28, 1959.

An object of the present invention is the provision of novel apparatus for scanning successive areas of character-bearing documents and the like at high speed to produce signals indicative of the presence or absence of portions of such character along prearranged lines of scan for use in connection with automatic character sensing and like functions.

Another object of the present invention is the provision of novel mechanical scanning apparatus for use with automatic character sensing equipment and the like, which scanning apparatus is characterized by high precision and accuracy of the time relation of scanning patterns produced thereby and high speed of operation.

Another object of the present invention is the provision of novel mechanical scanning apparatus for use with automatic character sensing equipment and the like, which scanning apparatus is characterized by simplicity of construction and low maintenance requirements.

Another object of the present invention is the provision of novel scanning apparatus for scanning document areas to produce information useful in automatic character sensing functions, having means associated therewith permitting accurate adjustment of production of selected timing signals produced thereby in relation to scanning of document character areas to provide signals for selected control functions in the operation of automatic character sensing equipment.

Another object of the present invention is the provision of novel rotary disk scanning apparatus for mechanically scanning character areas of a character-bearing document or the like in a unique manner to produce signals useful in automatic character sensing apparatus.

Other objects, advantages and capabilities of the present invention will become apparent from the following detail description, taken in conjunction with the accompanying drawing, showing one preferred embodiment of the invention.

In the drawing:

Figure 1 is an optical schematic diagram of the optical scanning components of one form of scanning apparatus in which the present invention may be used; and Figure 2 is an elevational view of the scanning disk in the scanning unit illustrated in Figure 1, viewed from the line 2—2 of Figure 1.

Referring to the drawing wherein like reference characters designate corresponding parts throughout the several figures, the scanning assembly, generally indicated by the reference character 10, is mounted directly over feed track 11 of suitable automatic document feed mechanism so that the optical center axis of the scanning unit 10 is perpendicular to the plane of the feed track with the optical center axis lying in the center of the scan zone from which information is to be read. The reading area is brightly illuminated by a pair of prefocused lamps 12, which may be type 1383 lamps.

Light reflected from the document, indicated generally at 13, is focused by a focusing lens 14, and is bent through an angle of 90 degrees by a first surface mirror 15, and thence through a correcting lens 16 to focus the image of the document on the plane of the scanning disk 17. The scanning disk is provided with a central shaft 17' rigidly affixed thereto which is supported for rotation in suitable fixed bearings. The shaft 17' is driven at high speed by a synchronous motor 18 interconnected with the shaft 17' in any conventional manner. As will be apparent from Figure 2, the scanning disk 17 is provided with a number of equally spaced radial slits 19 disposed near the periphery of the disk 17. In a preferred embodiment, the scanning disk is a 7.5 inch diameter aluminum disk containing 20 0.010 inch wide radial slits 19 spaced at equal intervals of approximately 18 degrees. The scanning disk 17 in this preferred embodiment is rotated at a rate of 7200 revolutions per minute, thereby providing 2400 scans per second as a scan repetition rate. The portion of the image which passes through the radial slits 19 in the scanning disk 17 falls upon a fixed slit plate 20 having a pair of horizontal slits 21, 22 therein which are slightly shorter in length than the spacing between successive radial slits 19 of the scanning disk 17. In a preferred embodiment, these slits are 0.86 inch long, 0.01 inch wide, and are spaced 0.10 inch apart vertically. The beam transmitted by the uppermost fixed horizontal slit 21 is bent laterally into a parallel path with the transmitted beam by a pair of mirrors 23 and is transmitted through an optical loop 24 to the photocathode of a photomultiplier tube 25. The beam transmitted by the lowermost fixed horizontal slit 22 is directed by an optical loop 26 onto the photocathode of a photomultiplier tube 27. The purpose of the lenses 24 and 26 is to defocus the image so that variations in sensitivity from point to point on the photocathode surface will not cause excessive noise.

In the operation of the scanning unit 10, light from the illuminating lamps 12 is reflected from the surface of the document 13 as the document passes the reading stage. As the image of the document at the reading stage is focused on the plane of the scanning disk 17 in the path of the scanning disk radial slits 19, passage of a radial slit 19 under the image allows a thin slice of the image to fall upon the fixed slit plate 20. This thin slice travels across the image, allowing a changing portion of the image to fall upon the slit plate 20 as the disk 17 rotates. The portions of the radial image which intersect the two horizontal slits 21, 22 are directed onto the photocathodes of the photomultipliers 25 and 27.

The effect of this scanning operation is to provide simultaneous scanning of two lines across the image. The direction of scanning is normal to the direction of image motion due to movement of the document 13 by the document feed mechanism 11. Thus, the scanning unit causes the vertical scanning along a pair of fixed lines while the motion of the document causes the scans to progress horizontally with respect to the document.

The length of the horizontal slits 21, 22 is slightly less than the distance between successive slits 19 so that there is an interval after the completion of one scan and before the beginning of the next scan when no light passes through the scanning disk 17. This interval is called the "dark time" and the pulse which it causes is called the "black pulse." This pulse is to be used for producing constant pulse amplitudes of output pulses produced in response to imaging of dark character portions on the photocathodes of the photomultiplier tubes 25 and 27. The dark pulse therefore forms, in effect, a referencing pulse which is a product of the photomultiplier tube response to a standard light intensity level by which output pulse amplitudes may be adjusted by appropriate circuitry. Circuitry which will effect this purpose is disclosed in detail in the above-mentioned patent of David H. Shepard and Howard W. Silsby III, Number 2,943,208.

In practice, the scanning rate which, in the preferred embodiment, is 2400 scans per second, is sufficiently faster than the document motion at the reading station that 25 or 30 scans will occur as one character is passing the reading station. Accordingly, the relationship of the parts of the scanning unit described above is such that during a single scan, the output from the photomultiplier tube circuits of tubes 25 and 27 will contain pulses of a preselected polarity representing dark portions of the character intercepting the line of scan produced by one of the radial slits 19 and the two horizontal slits 21, 22, with the voltage produced at the output of the photomultiplier tube circuits between occurrence of these pulses representing the background light intensity reflected from the paper or other document surface. Due to the fact that the length of the horizontal slits 21, 22 is slightly less than the distance between the successive radial slits 19, the output from the photomultiplier tube circuits for each scan cycle will include, in addition to the above described character portion indicating pulses and the intervening voltage representing background light intensity, a black pulse whose voltage level is determined by the conduction characteristics of the photomultiplier tubes 25 and 27 when all light from the reading station is shielded from their photocathodes.

By suitable circuitry as described in said Patent No. 2,943,208, a control voltage is produced which bears a preselected relation to the departure from a selected difference of the difference between the voltage level of the "black pulse" and the most negative voltage level of the output from the photomultiplier tube circuits in response to background light reflectivity and applying this control voltage to the photomultiplier tube to vary their gain in a direction to bring the detected difference in correspondence with the selected difference.

Provision is also made in the scanning unit 10 for providing timing signals, designated T*f*, which identify the end of each scanning frame. For this purpose, an exciter lamp 28 which, in the preferred embodiment, may be a type 1073 lamp, is mounted in front of the scanning disk 17 on an adjustable radial bracket 29 which is journalled at its inner end about the shaft 17' of the scanning disk 17. The T*f* mounting bracket 29 extends radially from the shaft 17' to a position beyond the periphery of the scanning disk 17 and is provided with a radial slit 30 which is in registry with the path of the radial slits 19 of the scanning disk 17 to allow a narrow radial beam of light emitted from the exciter lamp 28 to pass through the slit 30 onto the scanning disk 17. A photocell 31, which may in the preferred embodiment be a 1P42 photocell, generates the timing signal T*f* in response to light excitation of its photocathode. The photocell 31 is mounted on or behind the T*f* mounting bracket 29 in alignment with the exciter lamp 28 and the radial slit 30. Thus, each time one of the scanning disk slits 19 passes under the radial beam of light transmitted through the T*f* radial slit 30, the beam strikes the photosensitive end of the photocell 31 causing an increase in the current flow between the two elements of the photocell 31. By suitable conventional circuitry such as a load resistor between the plate of the photocell 31 and the positive plate voltage source, this increase in current upon excitation of the photocell 31 produces a negative pulse at the plate of the photocell 31 which forms the timing pulse T*f*. By supporting the exciter lamp 28 and the T*f* photocell 31 on the radial bracket 29 in which the radial slit 30 is provided with the photocell 31 disposed so that the portions of the scanning disk 17 in which the radial slits 19 are provided extend between the outer portion of the mounting bracket 29 and the photocell 31, the adjustment of these components for determining the time relation of the timing pulse T*f* to the scanning of the document area so as to cause the T*f* pulse to be produced just before each radial slit 19 leaves the horizontal slits 21, 22 is exceedingly facilitated. Since the timing of the production of the timing pulses T*f* in relation to the time of occurrence of the end of the vertical scan lines between radial slits 19 and the horizontal slits 21, 22 is a sufficiently critical adjustment to require the positions of the exciter lamp 28, slit 30 and photocell 31 to be adjusted circumferentially of the scanning disk 17, the above-described construction permits this critical adjustment to be made with a minimum of difficulty due to the fact that all of the elements are rigidly supported on the mounting bracket 29 to move in unison therewith.

By the above construction therefore, a mechanical scanning unit is provided for automatic character sensing equipment which facilitates the simultaneous scanning of a character area along two parallel lines of scan extending along axes perpendicular to the direction of motion of the characters, which operates at a very high scanning rate so that approximately 25–30 scans may occur as one character passes the reading station, and which is highly reliable in operation and requires a minimum of servicing. The above-described arrangement facilitates the precise adjustment of the time of production of the $T_f$ timing pulses during the scanning cycle, and the relationship of the length of the horizontal fixed slits 21, 22 to the radial slits 19 is such as to provide a short duration period during each scanning cycle when the light from the reading area is completely shielded from the phototubes to entrain standardizing reference pulses with the phototube output for use in adjusting the sensitivity of the phototubes and facilitate production of constant pulse amplitudes at the phototube outputs in spite of wide variations in ink-paper contrast and light intensity.

While but one specific embodiment has been illustrated in detail in the accompanying drawings, it is apparent that various modifications may be made in the invention without departing from the spirit and scope thereof, and it is desired, therefore, that only such limitations shall be placed thereon as are set forth in the appended claims.

I claim:

1. Scanning apparatus for use with automatic character sensing equipment and the like to scan areas of a character-bearing document passing through a reading station through which the document is fed comprising photocell means for producing output voltage signals bearing a selected relation to the light intensity to which the photocell means is exposed, optical means for directing an image of a document area disposed at said reading station toward said photocell means to condition said photocell means in accordance with the light intensity at said reading station, said optical means including focusing lens means for focusing said image in a selected image plane, planar optical stop means interposed between said reading station and said photocell means in intercepting relation to the image with the plane of said optical stop means lying in said selected image plane for restricting exposure of said photocell means to portions of said image in accordance with a preselected scanning pattern, said stop means including at least one stationary slit arranged in the path of the image in parallelism with a selected transverse axis of the image, a cyclically movable group of spaced slits to be swept over the length of said stationary slit along the axis thereof with said moving slits extending transversely across said stationary slit to form scanning apertures at the intercepts of said slits for transmission of registering portions of said image to said photocell means, and means for sweeping said moving slits successively across said stationary slit to cyclically scan the image along at least one scanning line, the length of said stationary slit being slightly less than the distance between adjacent pairs of said moving slits to provide non-transmissive intervals between the sweeping of successive moving slits across said stationary slit for activating said photocell means to produce short period output reference pulse amplitudes responsive to a standardized light intensity level.

2. Scanning apparatus for use with automatic character sensing equipment and the like to scan areas of a character-bearing document passing through a reading station through which the document is fed comprising photocell means for producing output voltage signals bearing a selected relation to the light intensity to which the photocell means is exposed, optical means for directing an image of successive document areas disposed at said reading station toward said photocell means to condition said photocell means in accordance with the light intensity at said reading station, optical stop means interposed between said reading station and said photocell means in intercepting relation to the image for restricting exposure of said photocell means to portions of said image in accordance with a preselected scanning pattern, said stop means including stationary slit means disposed in the path of the image having a pair of spaced parallel slits extending transversely of the optical axis of the image, a rotatable disk intercepting said image in advance of said slit means having a plurality of radial slits therein spaced uniformly along a circular path concentric with the axis of the disk to be swept over the length of said stationary slits with said radial slits extending transversely across both of said stationary slits and form scanning apertures at the intercepts of said slits for transmission of registering portions of said image to said photocell means, and means for rotating said disk at high speed about its center to scan the image along a pair of parallel scanning lines upon passage of each radial slit over said stationary slits, the length of said stationary slits being slightly less than the distance between adjacent pairs of said radial slits to provide a short duration non-transmissive interval between each scanning cycle for production of an output reference pulse amplitude from said photocell means responsive to a standardized light intensity level.

3. Scanning apparatus for use with automatic character sensing equipment and the like to scan areas of a character-bearing document passing through a reading station through which the document is fed comprising photocell means for producing output voltage signals bearing a selected relation to the light intensity to which the photocell means is exposed, optical means for directing an image of successive document areas disposed at said reading station toward said photocell means to condition said photocell means in accordance with the light intensity at said reading station, optical stop means interposed between said reading station and said photocell means in intercepting relation to the image for restricting exposure of said photocell means to portions of said image in accordance with a preselected scanning pattern, said stop means including stationary slit means disposed in the path of the image having a pair of spaced parallel slits extending transversely of the optical axis of the image, a rotatable disk intercepting said image in advance of said slit means having a plurality of radial slits therein spaced uniformly along a circular path concentric with the axis of the disk to be swept over the length of said stationary slits with said radial slits extending transversely across both of said stationary slits and form scanning apertures at the intercepts of said slits for transmission of registering portions of said image to said photocell means, and means for rotating said disk at high speed about its center to scan the image along a pair of parallel scanning lines upon passage of each radial slit over said stationary slits, the length of said stationary slits being slightly less than the distance between adjacent pairs of said radial slits to provide a short duration non-transmissive interval between each scanning cycle for production of an output reference pulse amplitude from said photocell means responsive to a standardized light intensity level, said disk having a central shaft, a radial bracket rotatably supported for adjustment on said shaft and extending from said shaft beyond the periphery of said disk, said radial bracket having a slit therein extending radially of said shaft and overlying the path of radial slits in said disk, and an exciter lamp and a photocell mounted in spaced relation on said bracket in alignment with said radial slit on said bracket to receive said disk therebetween for activating said last-mentioned photocell to produce a timing pulse marking coincidence of each of said first-mentioned radial slits with the end of said stationary slits upon registry of said first-mentioned radial slits with the slit of said bracket.

4. Scanning apparatus for use with automatic character sensing equipment and the like to scan character areas of a character-bearing document along lines of scan extending normal to and progressing along a document feed axis comprising a rotatable disk having a plurality of identical radial slits therein spaced uniformly along a circular path concentric with the axis of said disk, means for rotating said disk at high speed, optical means for directing an image of the area of said character-bearing document at said reading station toward said disk in the path of said radial slits, a stationary stop plate disposed parallel to the plane of said disk in a position to intercept portions of said images transmitted through said radial slits, said stationary stop means having a pair of parallel spaced slits therein extending along axes arranged parallel to a tangent of said disk whereby the image portions transmitted through said radial slits are swept substantially simultaneously along the full length of both of said stationary slits, and photocell means positioned adjacent to said stationary plate means and associated with each of said parallel slits to be activated in response to the light intensity of the portions of said images transmitted through the registering portions of said radial slits and said parallel slits, the length of said parallel slits being slightly less than the distance between an adjacent pair of said radial slits to provide a short duration interval between each scan during which said disk and plate means shield said photocell means from said images to produce an output reference pulse amplitude indicative to the photocell means response to a standardized light intensity level.

5. Scanning apparatus for use with automatic character sensing equipment and the like to scan areas of a character-bearing document passing through a reading station through which the document is fed comprising photocell means for producing output voltage signals bearing a selected relation to the light intensity to which the photocell means is exposed, optical means for directing an image of successive document areas disposed at said reading station toward said photocell means to condition said photocell means in accordance with the light intensity at said reading station, optical stop means interposed between said reading station and said photocell means in intercepting relation to the image for restricting exposure of said photocell means to portions of said image in accordance with a preselected scanning pattern, said stop means including at least one stationary slit disposed in the path of the image in parallelism with a selected transverse axis of the image, a rotatable disk intercepting said image in advance of said stationary slit having a plurality of radial slits therein spaced uniformly along a circular path concentric with the axis of the disk to be swept over the length of said stationary slit with said radial slits extending transversely across said stationary slit and form scanning apertures at the intercepts of said slits for transmission of registering portions of said image to said photocell means, and means for rotating said disk at high speed about its center for sweeping said radial slits successively across said stationary slit to cyclically scan the image along at least one scanning line, the length of said stationary slit being slightly less than the distance between adjacent pairs of said radial slits to provide a short duration non-transmissive interval between the sweeping of successive radial slits across said stationary slit for activating said photocell means to produce short period output reference pulse amplitudes responsive to a standardized light intensity level, said disk having a central shaft, a radial bracket rotatably supported for adjustment on said shaft and extending from said shaft beyond the periphery of said disk, said radial bracket having a slit therein extending radially of said shaft and overlying the path of the radial slits in said disk, and an exciter lamp and a photocell mounted in spaced relation on said bracket in alignment with said radial slit on said bracket to receive said disk therebetween for activating said last-mentioned photocell to produce a timing pulse marking coincidence of each of the radial slits in said disk with the end of the stationary slit in said optical stop means upon registry of the radial slits in said disk with the slit of said bracket.

References Cited in the file of this patent

UNITED STATES PATENTS

| | | |
|---|---|---|
| Re. 19,441 | Sparkes | Jan. 22, 1955 |
| 2,476,985 | Levy | July 26, 1949 |
| 2,524,531 | Lange | Oct. 3, 1950 |